J. H. MELLON.
ROLL SECURING DEVICE FOR PRINTING PRESSES.
APPLICATION FILED NOV. 1, 1913.
1,147,964.
Patented July 27, 1915.
2 SHEETS—SHEET 1.
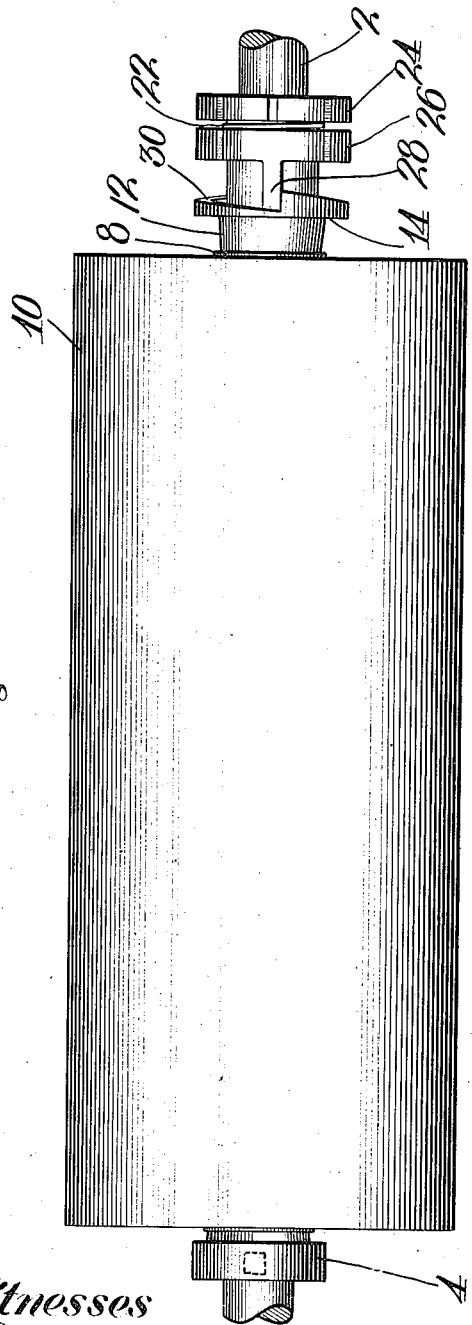
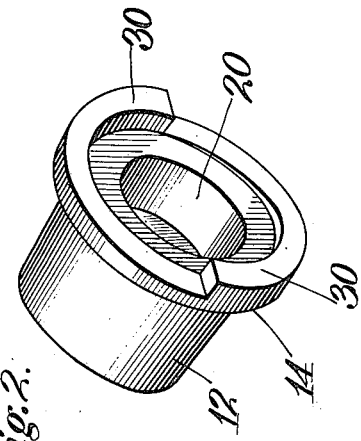
Witnesses
Frank R Glore
Inventor
J. H. Mellon
By George F Thorpe Atty.

J. H. MELLON.
ROLL SECURING DEVICE FOR PRINTING PRESSES.
APPLICATION FILED NOV. 1, 1913.
1,147,964.
Patented July 27, 1915.
2 SHEETS—SHEET 2.
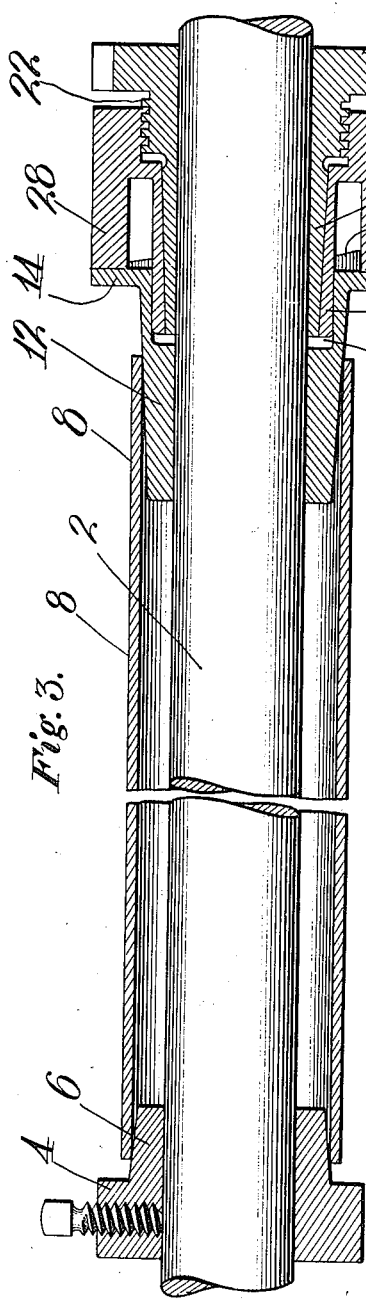
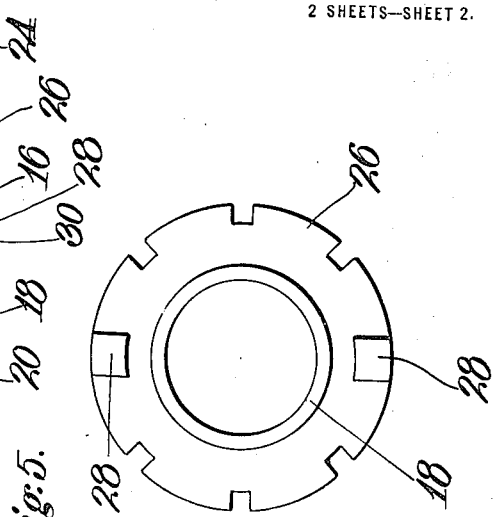
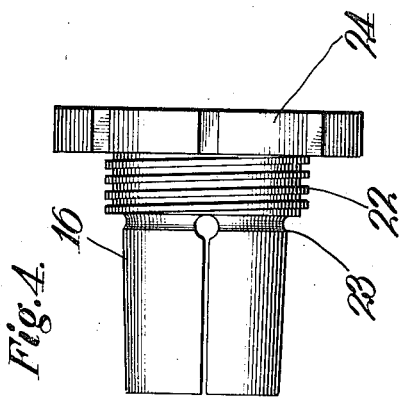
Witnesses
Inventor
J. H. Mellon
By ......... Atty.

though expansible into engagement with

UNITED STATES PATENT OFFICE.

JOHN H. MELLON, OF KANSAS CITY, MISSOURI.

ROLL-SECURING DEVICE FOR PRINTING-PRESSES.

1,147,964.  Specification of Letters Patent.  Patented July 27, 1915.

Application filed November 1, 1913. Serial No. 798,756.

*To all whom it may concern:*

Be it known that I, JOHN H. MELLON, a citizen of the United States, residing at Kansas City, in the county of Jackson and State of Missouri, have invented certain new and useful Improvements in Roll-Securing Devices for Printing-Presses, of which the following is a specification.

This invention relates to roll securing devices for printing presses and the object in view is to provide an improved construction for clamping the roll carrying sleeve securely to the paper roll mandrel.

To this end the invention comprises certain parts which may be readily and quickly applied to the roll mandrel and thereafter be securely clamped in roll-holding position by the turning of the roll.

With this general object in view the invention consists in certain novel and peculiar features of construction and organization as hereinafter described and claimed; and in order that it may be fully understood reference is to be had to the accompanying drawing, in which—

Figure 1, is a plan view of the roll retained in position by means of my improvements. Fig. 2, is a perspective view of one of the clamping members. Fig. 3, is a longitudinal section through the parts shown in Fig. 1 but omitting the roll. Fig. 4, is a plan view of one of the clamping parts, and Fig. 5, is an end view of one of said parts.

Referring to the drawings, the roll mandrel 2, which is mounted in the press in the usual manner, is provided with a set collar 4 having a tapered extension or sleeve 6 for fitting inside and supporting one end of a sleeve or core 8 which constitutes a holder for the paper roll 10.

For supporting the other end of the core and clamping the same to the mandrel, I have provided a tapered sleeve 12 having a cam flange 14, together with a pair of sleeves 16 and 18 adapted to clamp the mandrel and also operate said tapered sleeve 12. The sleeve 12 is provided with an internal recess 20, at its outer end, within which extend the inner ends of sleeves 16 and 18. The sleeve 16 is both split and tapered and fits inside the sleeve 18, the bore of which tapers in the same direction as sleeve 16. The sleeve 16 is provided with an externally threaded portion 22 to coöperate with the correspondingly internally threaded portion of the outer end of the sleeve 18. An annular groove 23 is formed in the sleeve 16 adjacent the portion 22 to lend resiliency to the split portion of the sleeve. The sleeves 16 and 18 are also provided at their outer ends with the wrench heads 24 and 26 respectively, and sleeve 18 is further provided with a pair of lugs 28 adapted to engage a pair of cam surfaces 30 on the flange 14.

In the use of the device the sleeve or core 8 with the roll of paper 10 thereon is placed in the position shown, with one end of the sleeve fitting the tapered extension 6 of the collar 4. The tapered sleeve 12 is then fitted into the other end of the core 8 and the inner end of the sleeve 18 inserted in the recess 20 with the lugs 28 resting against the lowest points of the cam surfaces 30. The sleeve 16 is next screwed up within sleeve 18 thereby clamping sleeve 16 firmly against the mandrel, suitable wrenches being used to accomplish this adjustment. If now the paper and its core be rotated they will tend to cause the sleeve 12 to rotate on the end of sleeve 16 and this drag on the sleeve 12 will result in the same being gradually forced into the end of the core 8 and wedged tightly therein by the action of the lugs 28 and cams 30, it being understood that the latter taper in the direction of the rotation of the roll.

From the foregoing it will be apparent that I have produced a simple and effective device for carrying out the object of my invention and one that will readily accommodate different sizes of paper roll cores and while I have illustrated and described the preferred embodiment of the same, I reserve the right to make all changes properly falling within the spirit and scope of the appended claims.

I claim:

1. In a device for clamping paper roll holders upon a mandrel, a tapered sleeve mounted on the mandrel and fitting within and engaging the inner surface of the holder, a second sleeve fitting loosely around the mandrel and projecting at one end into the bore of the first-named sleeve, the bore of said second sleeve tapering inwardly, one of said sleeves having a cam surface member and the other a lug member adapted for mutual engagement at times, and a split clamping sleeve fitting upon the mandrel within the bore of said second sleeve and adapted to be clamped by the latter rigidly to the mandrel and anchor the said second sleeve firmly to form a resistance point whereby when the roll turns the first-named sleeve the latter shall be wedged more firmly in the holder through the travel of the said member of said sleeve upon the said member constituting a part of said second sleeve.

2. In a device for clamping paper roll holders upon a mandrel a tapered sleeve to fit upon the mandrel and within one end of the holder, the bore of said sleeve being enlarged at its outer end to provide a recess, a second sleeve fitting around the mandrel and projecting into said recess of the first-named sleeve, the bore of the second sleeve tapering toward the first-named sleeve, said second sleeve having an internal thread at its outer end, one of said sleeves having a cam member and the other a lug member for mutual engagement at times, a split clamping sleeve fitting on the mandrel within the tapered bore of said second sleeve and provided with an external thread engaging the internal thread of said second sleeve and adapted to be screwed into the latter, to cause it to clamp the said clamping sleeve immovably upon the mandrel and be itself anchored so as to form a resistance point to effect further wedging of the first-named sleeve into the holder through the coöperative action of the said members on the first-named pair of sleeves.

3. In a device for clamping paper roll holders to the mandrel, a tapered sleeve adapted to fit between the mandrel and holder, said sleeve being provided with a recess in one end thereof, and with a flange having a cam surface, a pair of telescoping clamping sleeves fitting within said recess, the inner clamping sleeve being split and externally threaded and the outer clamping sleeve being internally threaded whereby upon screwing the inner sleeve into the outer, said telescoping sleeves will be clamped to the mandrel, and a lug carried by said outer sleeve and adapted to coöperate with said cam surface to force said tapered sleeve into said holder when the holder is rotated.

In testimony whereof, I affix my signature, in the presence of two witnesses.

JOHN H. MELLON.

Witnesses:
 CHAS. W. GERARD,
 G. Y. THORPE.